(12) United States Patent
Brown

(10) Patent No.: US 6,428,694 B1
(45) Date of Patent: Aug. 6, 2002

(54) SOLAR POWERED ENVIRONMENTAL REMEDIATION DEVICES

(75) Inventor: Anthony Brown, Huntington Beach, CA (US)

(73) Assignee: Komex H2O Science, Inc., Huntington Beach, CA (US)

( * ) Notice: Subject to any disclaimer, the term of this patent is extended or adjusted under 35 U.S.C. 154(b) by 0 days.

(21) Appl. No.: 09/441,570

(22) Filed: Nov. 17, 1999

(51) Int. Cl.[7] .............................. C02F 1/20; C02F 1/72; B09C 1/00; F03G 6/00
(52) U.S. Cl. .................... 210/170; 210/220; 210/416.1; 210/143; 210/747; 405/128; 60/641.8
(58) Field of Search ............................... 210/96.1, 143, 210/170, 205, 209, 220, 221.1, 416.1, 739, 743, 747; 405/128; 60/641.8; 166/246

(56) References Cited

U.S. PATENT DOCUMENTS

| | | | | |
|---|---|---|---|---|
| 4,303,833 A | * | 12/1981 | Eckel et al. | |
| 4,370,559 A | * | 1/1983 | Langley, Jr. | |
| 4,657,675 A | * | 4/1987 | Zan | |
| 4,802,829 A | * | 2/1989 | Miller | |
| 4,906,359 A | * | 3/1990 | Cox, Jr. | |
| 5,293,892 A | * | 3/1994 | Fourqurean | |
| 5,326,458 A | | 7/1994 | Johnson | |
| 5,419,655 A | * | 5/1995 | Phillips et al. | |
| 5,527,453 A | * | 6/1996 | Hachima | |
| 5,637,209 A | * | 6/1997 | Wright et al. | |
| 5,753,109 A | * | 5/1998 | Looney et al. | |
| 5,900,330 A | * | 5/1999 | Kagatani | |
| 5,961,841 A | * | 10/1999 | Bowers | |
| 6,042,701 A | * | 3/2000 | Lichwardt et al. | |
| 6,083,405 A | * | 7/2000 | Tanaka et al. | |
| 6,159,371 A | * | 12/2000 | Dufay | |
| 6,258,280 B1 | * | 7/2001 | Petrich | |

OTHER PUBLICATIONS

Remediation—Active/Durham Geo/F.A.P. Plus Pump System, Date Unknown.
Water supply by means of solar energy Apr. 3, 1998.
Remediation KVA Technology C–Sparger TM System, Date Unknown.
Xitech Instruments, Inc. 1998 Catalog Groundwater Remediation Instrumentation.
IMS Products, The Solar Sentinel, The Free Phase Hydrocarbon Skimmer System, 1997.

* cited by examiner

Primary Examiner—David A. Simmons
Assistant Examiner—Fred Prince
(74) Attorney, Agent, or Firm—Oppenheimer Wolff & Donnelly LLP

(57) ABSTRACT

Devices and methods of use of a non-traditionally powered environmental remediation device and, more particularly, to devices utilizing programmable logic controllers for remote operation, monitoring and data collection.

8 Claims, 17 Drawing Sheets

SOLAR POWERED ENVIRONMENTAL REMEDIATION DEVICES

BACKGROUND OF THE INVENTION

1. Field of Invention

This invention relates generally to devices for environmental remediation and, more particularly, to devices utilizing non-traditional energy sources and/or programmable logic controllers for environmental remediation.

2. Description of the Related Art

OBJECT AND SUMMARY OF THE INVENTION

A general object of the present invention is to provide devices that are useful for environmental remediation. More specifically, these remediation devices can be operated at a distance from a local power grid by utilizing non-traditional energy sources, and further utilize programmable logic controllers (PLC) for off-site monitoring and operation of the devices Environmental remediation is necessary, for example, where groundwater and soil have become contaminated, thus presenting an ecological threat to the environment. Methods of environmental remediation include, but are not limited to methods for recovery of free product from ground water, recovery of ground water itself, and aeration of groundwater or soil, air extraction from the soil and chemical or nutrient addition to the groundwater or soil. Each of these methods are effective in destroying or removing certain categories of contaminants from groundwater or soil.

Free product recovery is generally the process by which contaminated water, light or dense non-aqueous phase liquid contaminants are recovered and are then either processed through a treatment facility, or disposed of accordingly. Such contaminants are frequently, but are not limited to, separate phase volatile organic compounds (VOCs) such as petroleum hydrocarbons and chlorinated solvents. Recovery or destruction of contaminants can be achieved by utilizing compressed air to power a pump situated in a ground water well. Thus, the free product is directly removed from the ground water and temporarily stored above ground in a tank prior to disposal. By removing contaminant mass from the subsurface, the contamination is reduced. Free recovery has been found to be more efficient if the recovery pump is operated on an intermittent schedule. The most efficient recovery has been found to occur when free product is removed quickly, the product pump is turned off, the free product is allowed to return to it's static level in the well, and then the free product is pumped off again.

Aeration systems, such as bioventing and air sparging, are bioremediation and mass removal techniques used to treat soil contaminated with VOCs. The use of injected air in the subsurface is called aeration. Aeration can be used to remediate soil contaminated by releases of petroleum hydrocarbons, chlorinated solvents and other VOCs. Aeration reduces contamination levels by two mechanisms, one biochemical and one physical. In the former, the injected air increases the amount of oxygen in the subsurface, stimulating the growth and metabolism of indigenous microorganisms. These microorganisms use the contamination as an aerobic energy source, producing carbon dioxide and water as by-products. This process is known as bioremediation. In the second mechanism, the flow of air through contaminated soil forces VOCs into the air stream. Once entrained in the air stream the contaminants are removed from the subsurface by adjective flow and are typically recovered by vapor extraction wells for destruction. This process is called mass removal.

Generally, these two mechanisms are brought about by different airflow regimes. Bioremediation is stimulated by relatively lower airflow, while mass removal requires higher air flow. In either scenario, air is introduced into the subsurface by pressurizing a vapor well with compressed air. Air will flow from the higher pressure in the well through the well screen and into the subsurface formation. The ultimate disposition of the injected air is dependent upon the geology of the formation into which air is injected as well as the pressure gradient and flow rate.

Bioventing utilizes injections of oxygen into soil. Pressure and flow rates in bioventing systems are low to concentrate on maximizing aerobic degradation, and minimizing volatilization. Lower airflow creates the conditions necessary for bioremediation, which requires no secondary capture of mobilized VOCs. At higher airflow, bioventing can be used in conjunction with a soil vapor extraction (SVE) system to mobilize, and then remove soil contamination. Typical pressure and flow rates for bioventing systems are, 5–10 psi (34.5–68.9 kPa) and 2–6 cfm (57–170 lpm), respectively.

Air sparging is very similar to bioventing. Air sparging systems inject air into ground water as opposed to soil, and sparging systems work toward both aerobic degradation and volatilization. Air sparging systems generally have higher pressure and flow rates to overcome the pressure of the water column. Operationally, the air must be pumped into the injection well at a pressure sufficient to displace the water column and overcome frictional losses in the system and capillary resistance to the air entering the aquifer. The injected air will form a shape in the saturated zone that approximates an inverted cone. The dimensions of this cone are determined both by the geologic characteristics, especially grain size, of the saturated zone and the rate of flow of injected air. Operators of the sparging system can control air flow, i.e. volumetric flow rate, pressure, velocity. Typical pressure and flow rates for air sparging systems range from 5–50 psi (34.5–344 kPa) and 4–10 cfm (113–283 lpm) respectively, depending on soil type, depth to water column, radius of influence, and degree of volatilization. FIG. 1 shows how air sparging and SVE systems work together to reduce contamination. Neyer and Sutherson (1993) *Air Sparging: Savior of Ground Water Remediations or Just Blowing Bubbles in the Bath Tub; GWMR.*

A vacuum can be used under either scenario described above to increase air flow and aid in remediation. In the aeration scenario, lower airflow creates the conditions necessary for bioremediation, which requires no secondary capture of mobilized VOCs. At higher airflow, a vacuum can be used to mobilize and then remove soil contamination.

Injection of chemicals or nutrients into groundwater or soil is also a commonly applied remediation technology. Typically a liquid or foam is directly injected into a well from an above ground tank. By injecting appropriate chemicals or nutrients, biological growth may be enhanced to increase the remediation or consumption of the contaminants.

In addition to utilizing effective environmental remediation techniques, the present devices rely on non-traditional power sources. This is advantageous in many ways including, but not limited to that these devices can be installed in any location where a power supply necessary to run traditional systems is not available or is expensive to use or install, and the non-traditional power sources, such as solar panels, operate without fuel, waste or pollution. Further, the device's relatively simple construction makes installation relatively simple.

In addition to utilizing effective environmental remediation techniques, the present devices utilize PLCs for allow remote operation, monitoring and automated data collection. Remote monitoring saves cost of on-site inspections by technicians. Data collected may include, but mot be limited to, cumulative free product recovered, product and water levels in the well and air compressor run time, pressure and flow rate of the pump.

In accordance with one aspect of the present invention, these and other objectives are accomplished by providing a remediation device being non-traditionally powered and having a PLC to control the frequency and duration of system operation.

The above described and many other features and attendant advantages of the present invention will become apparent from a consideration of the following detailed description when considered in conjunction with the accompanying drawings.

BRIEF DESCRIPTION OF THE DRAWINGS

Detailed description of the preferred embodiments of the invention will be made with reference to the accompanying drawings.

DETAILED DESCRIPTION OF THE PREFERRED EMBODIMENTS

Figure 1:
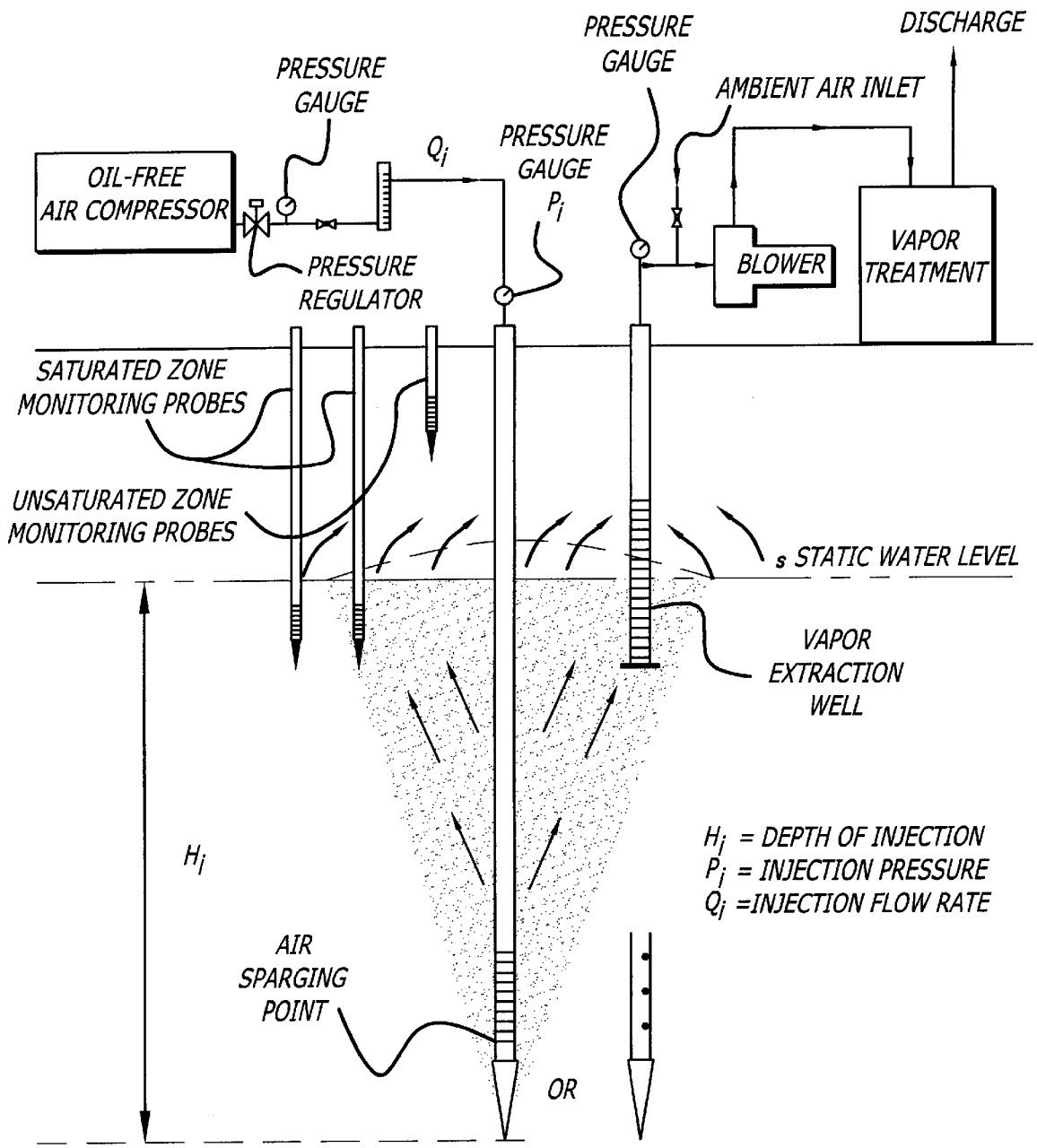
FIG. 1 depicts air sparging and SVE systems working together to reduce environmental contamination.
Figure 2A:
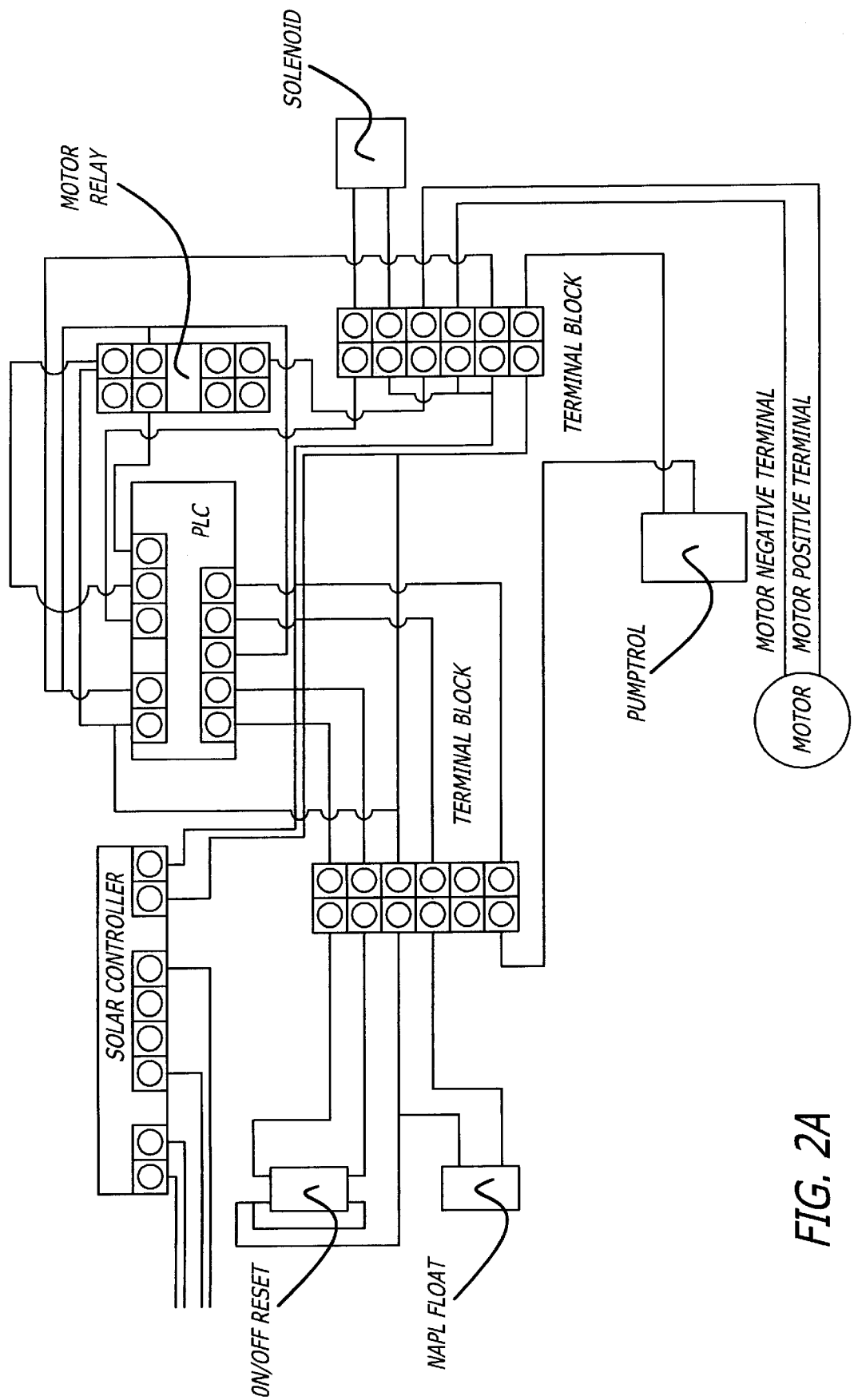
FIG. 2A depicts an electrical ladder diagram of one embodiment of the present invention.
Figures 2B, 2C:
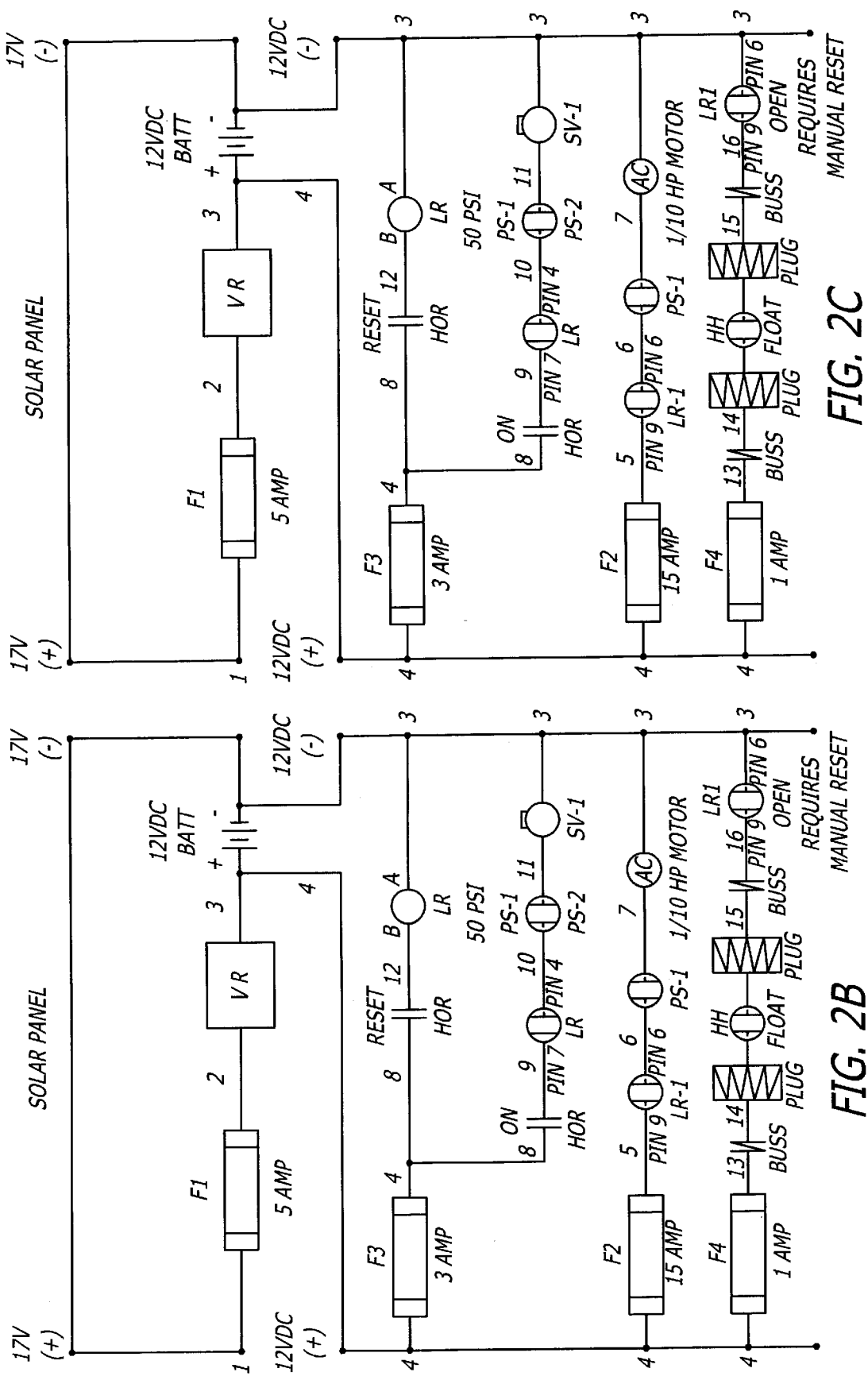
FIG. 2B depicts an alternate electrical ladder diagram of one embodiment of the present invention.
FIG. 2C depicts another alternate electrical ladder diagram of one embodiment of the present invention.
Figure 2D:
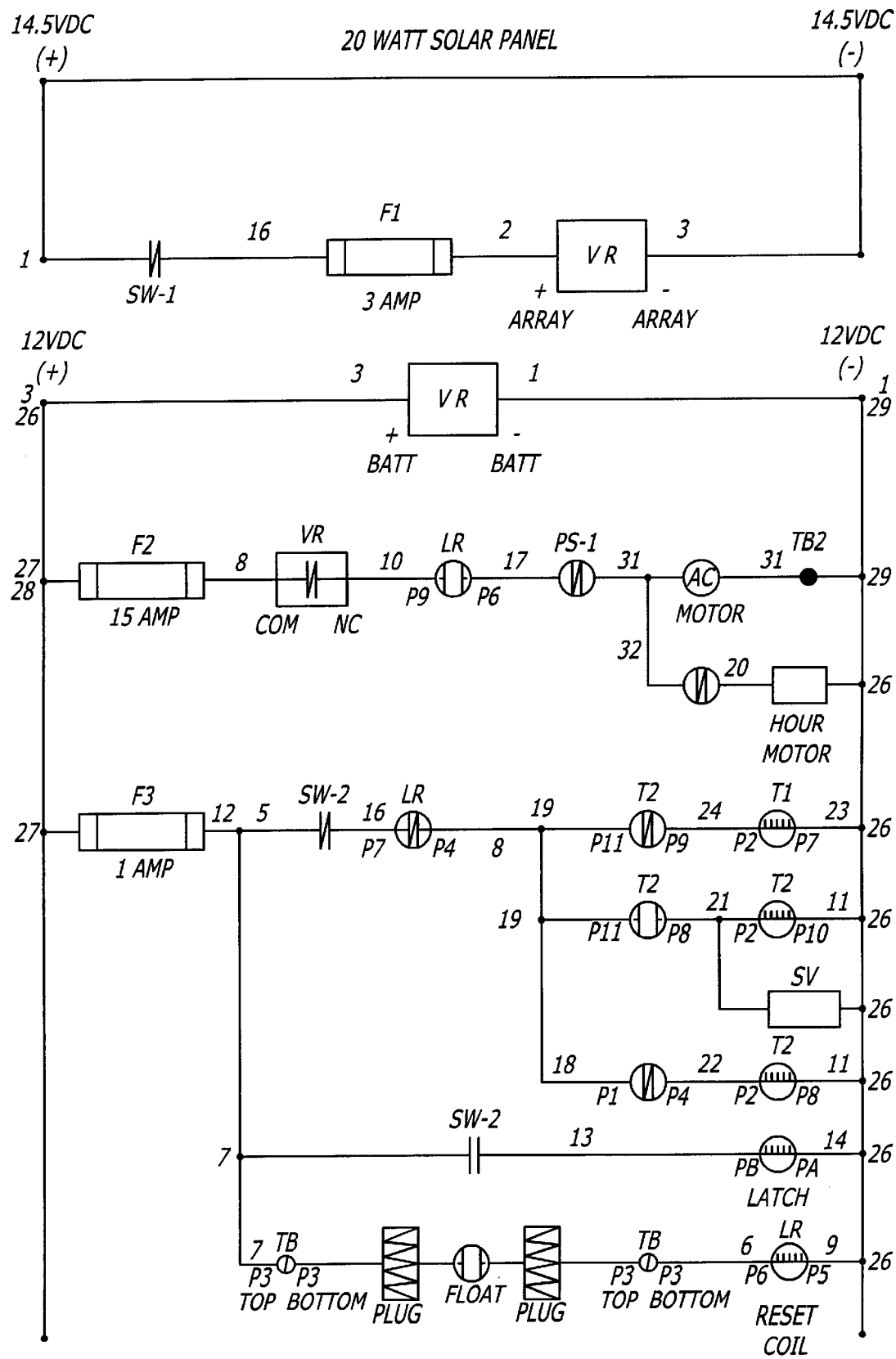
FIG. 2D depicts another alternate electrical ladder diagram of one embodiment of the present invention.
Figure 3A:
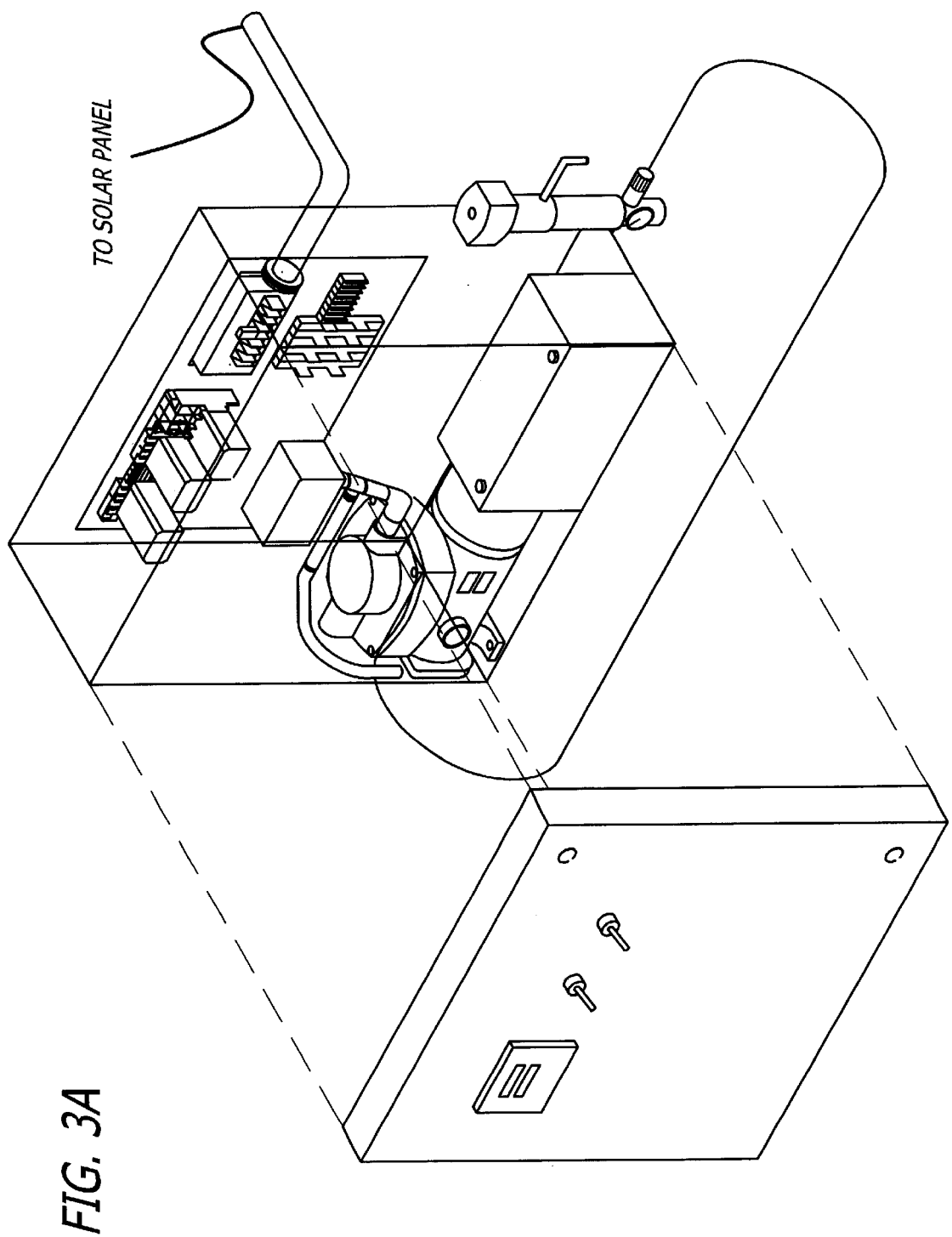
FIG. 3A depicts a device diagram of one embodiment of the present invention.
Figure 3B:
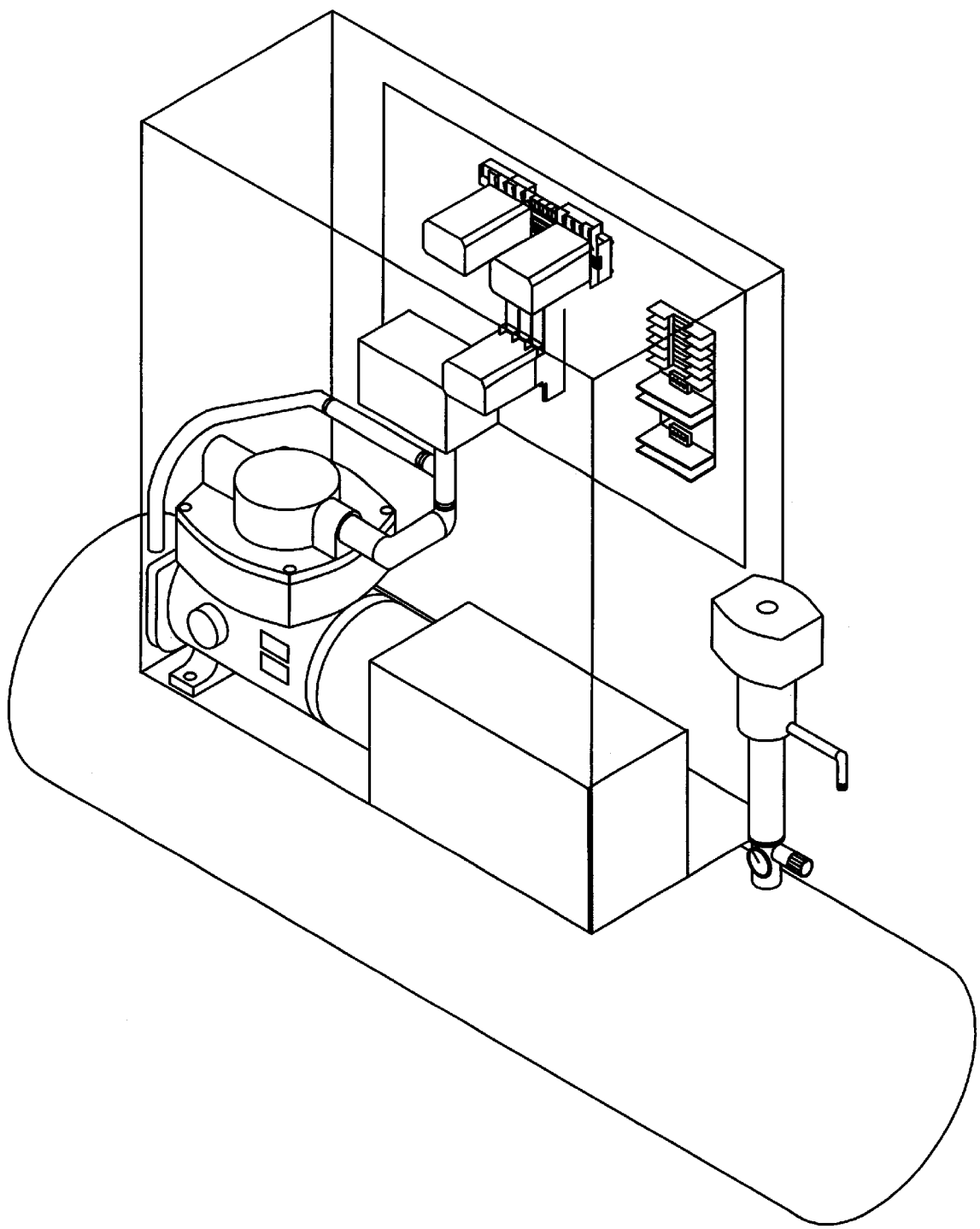
FIG. 3B depicts an alternate device diagram of one embodiment of the present invention.
Figure 3C:
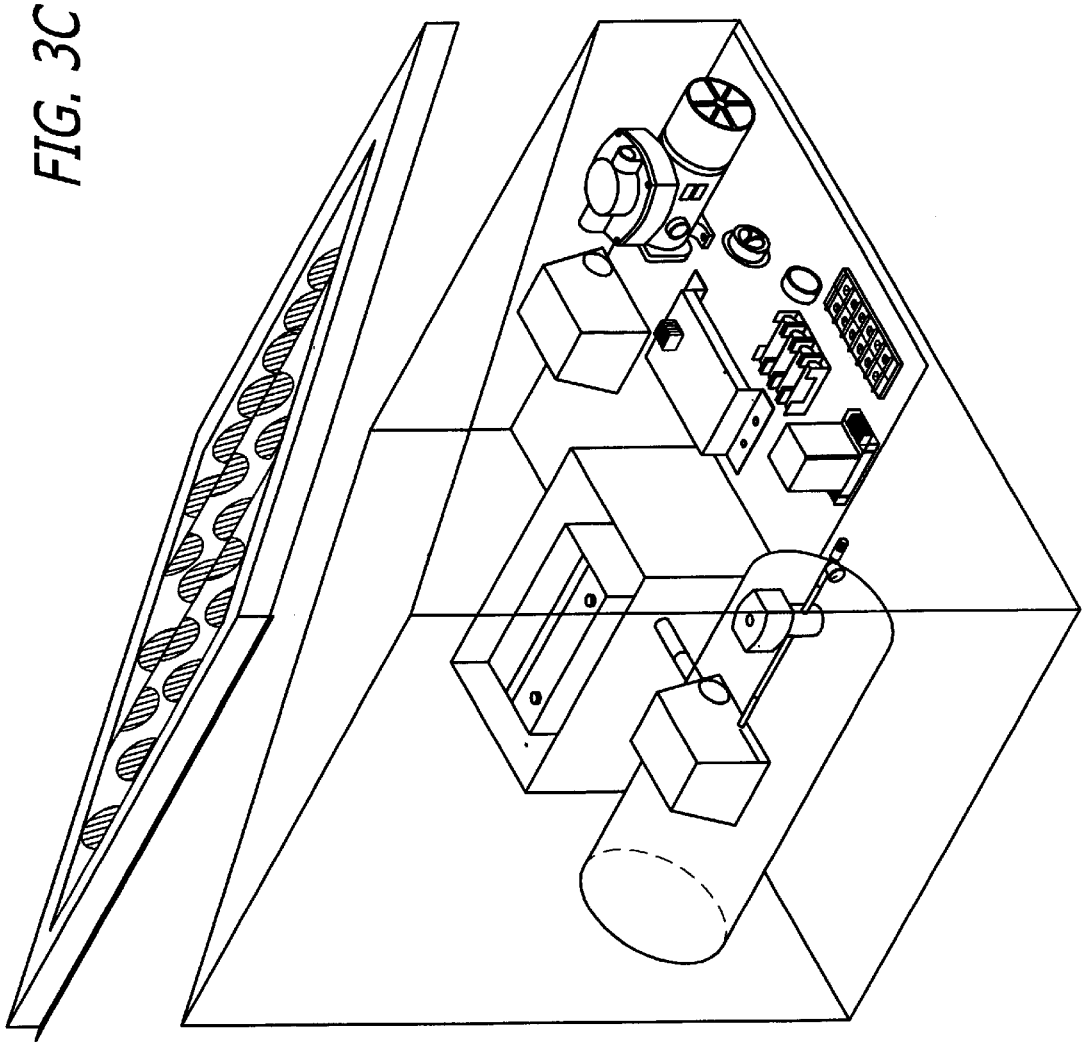
FIG. 3C depicts another alternate device diagram of one embodiment of the present invention.
Figure 4B:
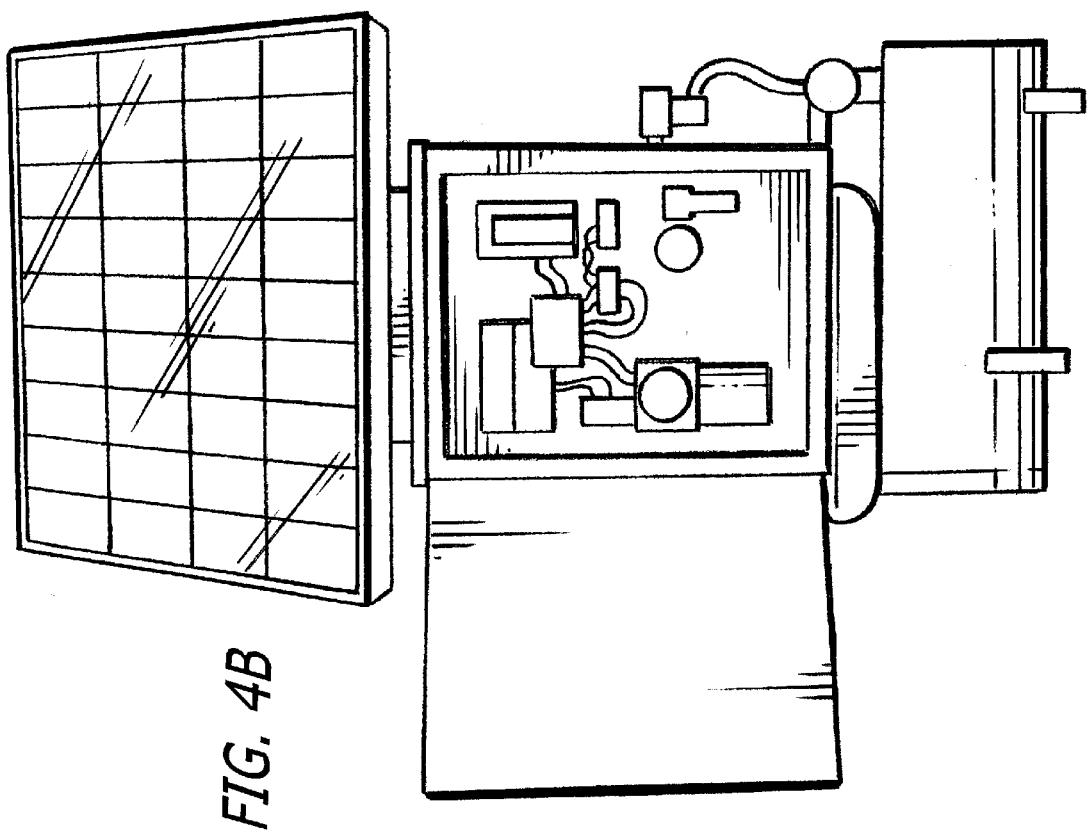
FIGS. 4A–C depict photographs of one embodiment of the present invention.
Figure 4A:
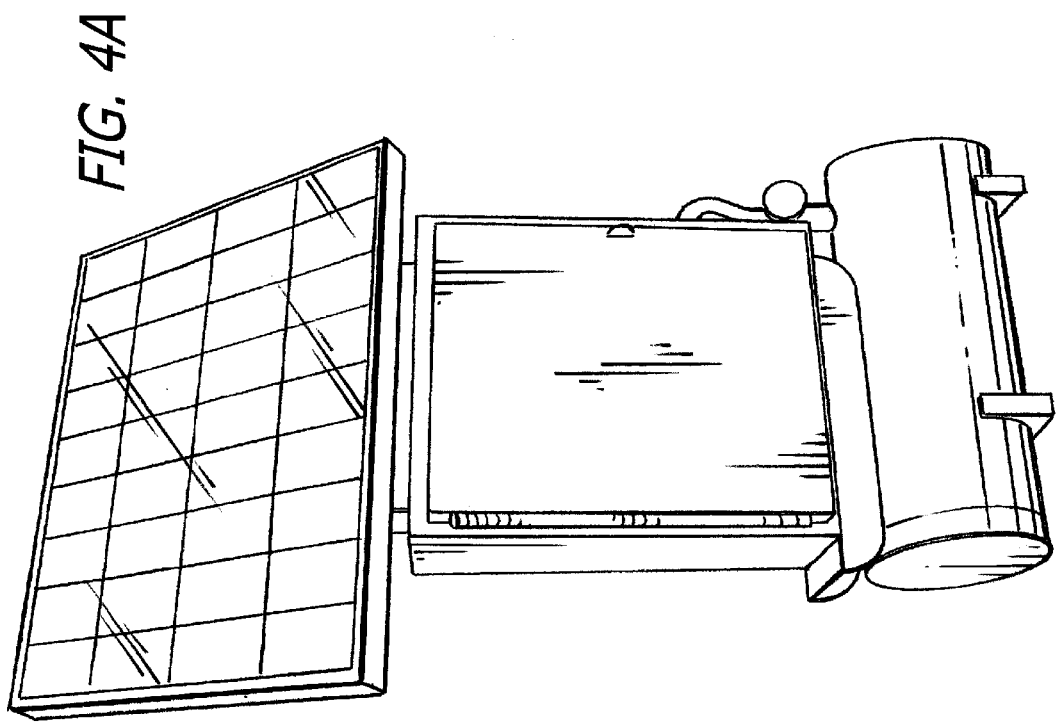
Figure 4C:
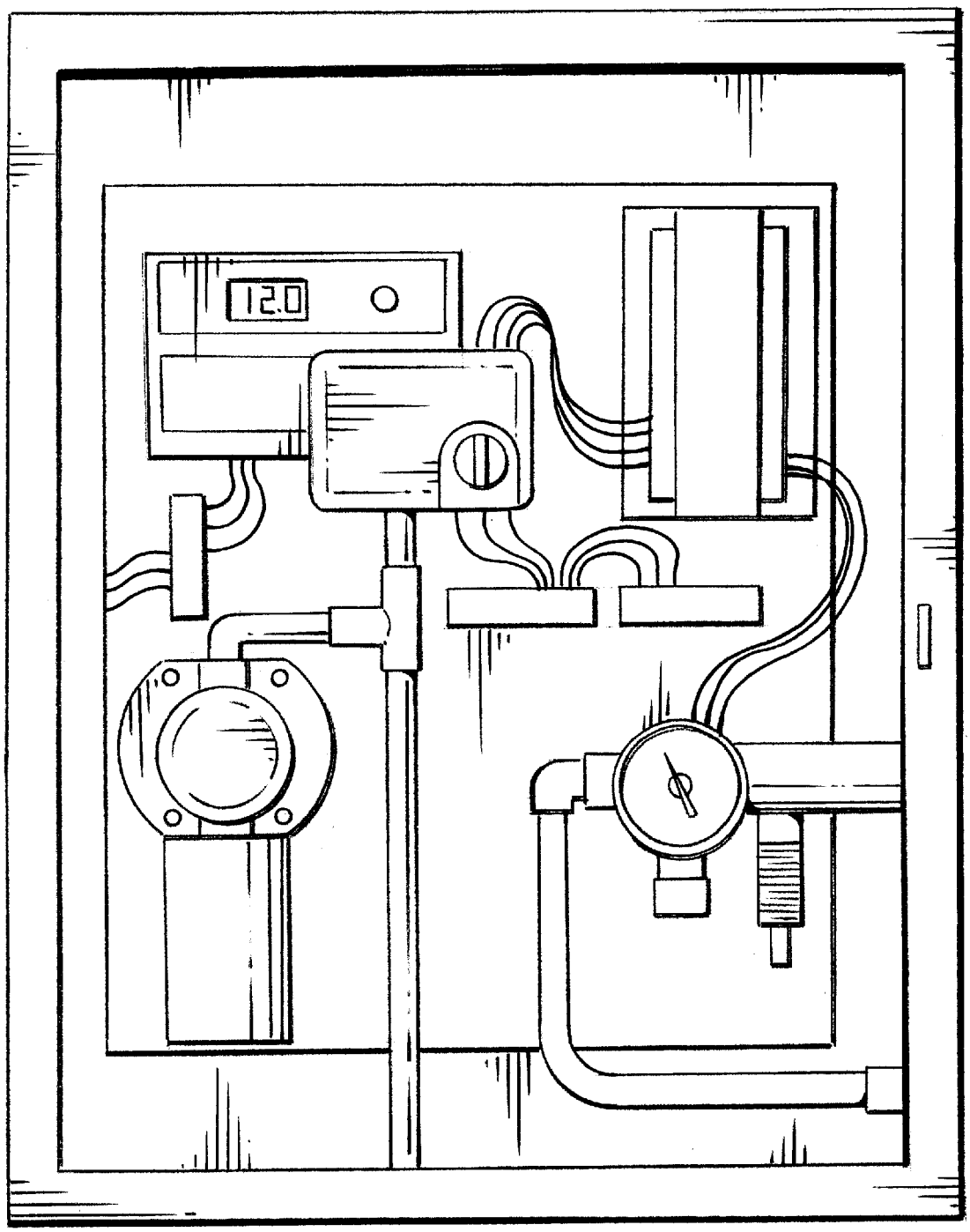

Disclosed herein is a detailed description of a best presently known modes of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Generally, the bioremediation devices comprise a non-traditional energy source, a voltage regulator; a battery; a PLC; a control panel; an air compressor pump; an air receiver tank; a solenoid valve and a means for effectuating the bioremediation of the groundwater or soil.

The non-traditional energy source of the device is preferably a solar panel. Where the energy source is a solar panel, the solar panel is most preferably a photovoltaic cell which produces a minimum of 16 to 20 amp-hours per day at 75 percent sunlight for a minimum of four hours. An example of a solar panel for use in the device is a 12- or 24-volt panel or array with a 100 watt, 5.9 amp efficiency (Model SR100; Siemens Solar Industries (Camarillo, Calif.)). Larger panels may be used for particular sites or applications. Where the energy source is not a solar panel, the energy source may be, but is not limited to, a device for harnessing wind power (a windmill, for example) or hydro-power (a dam, for example).

The voltage regulator preferably provides safe charging of the battery by the energy source and regulates the charge flow to maximize the operating life of the battery. The voltage regulator also preferably prevents discharge of the battery back through the energy source, such as in the solar panel during periods of no sunlight. One example of a voltage regulator which can be used in the device is the Prostar 30 (Morningstar Corporation) equipped with a link to a computer through an RS232 port, or equivalent.

The battery preferably provides 12-volt DC power to the device when the energy source is not providing power. Most preferably, it should capable of providing back up power for three days for a typical device. One example of a battery that can be used in the device is an industrial 12-volt deep cycle battery. The battery is preferably not of a group size less than 8-D, producing 225–255 amp-hours. Further, the battery is preferably adsorbed glass mat (AGM) construction, but may also be gel cell construction.

Most preferably, the unit shall provide a maximum continuous power of 300 Watts and a surge of 500 Watts at an optimum efficiency of more than 90 percent and a no-load current draw of less than 0.2 amps. Further, the unit preferably includes dual receptacles and low battery alarms at 9.5 volts and shut down at 8.0 volts.

The device also comprises a PLC and control panel. The control panel and PLC preferably to control the frequency and duration of system operation and record performance data. The PLC most preferably includes ports for communication connections (computer, with or without a modem or telephone/cell phone, for example) to monitor system operation and performance from off-site locations. The control panel preferably has a touch pad which allows a programmer to alter the operations of the system or collect data regarding system efficiency. The control panel most preferably has multiple inputs and outputs for system monitoring and response. One example of a control panel that may be used in this device is the DL105 PLC (Direct Logic) which has 10 inputs and 8 outputs, for example.

The solenoid valve preferably acts as the open/close control point for air supply to the well point. The solenoid valve is preferably controlled by the PLC and is preferably placed in line after the air receiver tank. One example of a solenoid valve that can be used in the device is a ASCO Red Hat two-way solenoid valve.

The air compressor is preferably an oil-free rocking piston pump capable of 5.5 psi maximum pressure and 2.33 cfm open air flow rate. One example of an air compressor useful in this device is the Gast Manufacturing Inc. (Benton Harbor, Mich.) Model SPP-4OGBL-101. The device also comprises an air receiver tank. The air receiver tank is preferably a 3- or 6-gallon tank. One example of an air receiver tank useful in this device is the Speedaire. In the alternative, the device may include an electric pump instead of the air compressor and air receiver tank.

The device also includes a means for effectuating the remediation. This element of the device may take the form of, but is not limited to a pneumatic pump, a vacuum, a blower or a peristaltic pump. Examples of pneumatic pumps with skimmer systems, include, but are not limited to those manufactured by Zorbo™ (Geotech Environmental Equipment, Inc.; Denver, Colo.). One example of a vacuum pump that may be used in the device is a Gast diaphragm pump.

Further, the device preferably contains sensors, most preferably located in proximity to the means for effectuating remediation. Such sensors may detect, but are not limited to detecting petroleum products, dissolved oxygen levels or pH.

The device may also include an energy inverter preferably converts the 12-volt power from the non-traditional power supply and battery to 120-volt AC power for operation of conventional equipment that is not manufactured to operate under 12-volt DC power. Examples of inverters that may be used in the device are the Cherokee Power Inverter Model P1-300 (Wireless Marketing Corporation (Schaumberg, Ill.)) or Trace Engineering Model DR2412.

The device may also include pressure switches to regulate the pressure within the system. For example, the device may have pressure switches located in the air receiver tank to monitor the pressure in the tank and maintain it at an effective level. A high-pressure can have a range of 80–100 psi and be equipped with a dual manual lever (Automatic-Off). A low-pressure switch can have a range of 0 to 40 psi and operate on an automatic setting. Examples of pressure switches useful in the invention are, but are not limited to Pumptrol or Grainger pressure switches.

The device preferably includes meters, such that a visual inspection of the device and its components can be made. One example of a meter that can be included is an electronic timer. One example of a timer that may be included is the 2500ES by Xitech or Geotechnical Services, Inc.

The device may further include a housing. The housing is preferably designed to house and protect all equipment of the device, except the energy source and the air receiver tank. Most preferably, the housing is enamel-coated steel with a watertight seal. One example of the dimensions of the housing is: 20 inches high by 16 inches wide by 6 inches deep, with a front opening locking panel.

The components of the device such as the solar panel, housing and air receiver tank are preferably mounted on mounting track or mounting rail. One example of mounting track which are useful in the invention are, but are not limited to Schedule 40 galvanized steel piping or Unistrut™ channel.

The components of the device are preferably connected by high-pressure flexible hosing with Schedule 40 galvanized steel pipe external fittings and external screw threads. Further, all fittings are preferably clamped or coated with pipe sealant to minimize air loss.

In one embodiment of the invention (FIG. A), which is preferably used for remediation of ground water contaminated by non-aqueous phase liquids and storage for treatment offsite, the device components are preferably selected to achieve an 0.70 cubic feet per minute (cfm) air flow at 70 pounds per square inch (psi) air pressure, pumping for six hours a day over three days, without sunlight to recharge the battery (FIGS. 2A–D).

The device preferably contains: a solar panel, a voltage regulator, a battery, a PLC, a control panel, an air compressor pump, an air receiver tank and a solenoid valve. The device also preferably includes a pneumatic pump installed into a ground well with a skimmer system for the collection of floating free product. The pneumatic pump is most preferably powered by compressed air stored in the air receiving tank. The device also preferably includes a storage tank for the collection and storage of floating free product (FIGS. 3A–C and 4A–C). Most preferably, the storage tank has a high level float switch to shutdown the air compressor and solenoid valve in the event of a high level condition.

Alternatively, the device is preferably controlled by a PLC. The PLC can, for example, regulate the injection pressure and air flow rate in the system by monitoring the pressure in the air receiver tank, turning on/off the air compressor or pneumatic pump, regulating the solenoid valve and monitoring the level of the storage tank. Further, the PLC can, for example, be programmed to prevent the voltage in the battery from dropping below a level necessary to run the pump. Finally, the PLC can also be programmed to operate the device intermittently to maximize remediation efficiency or power use considerations.

The device may further include a petroleum product sensor located within the aquifer such that the level of petroleum product can be monitored and the frequency and duration of the pumping can be controlled by the PLC.

In a second embodiment of the invention, which is preferably used to remove ground water during remediation of ground water contaminated by non-aqueous phase liquids, the device preferably achieves an 0.70 cubic feet per minute (cfm) air flow at 70 pounds per square inch (psi) air pressure, pumping for six hours a day over three days, without sunlight to recharge the battery.

As above, the device preferably contains: a solar panel, a voltage regulator, a battery, a PLC, a control panel, an air compressor pump, an air receiver tank and a solenoid valve. The device also preferably includes a pneumatic pump installed into a ground well with a skimmer system for the collection of floating free product. The pneumatic pump is most preferably powered by compressed air stored in the air receiving tank. The device also preferably includes a storage tank for the collection and storage of floating free product. As above, the device is preferably controlled by a PLC.

In a third embodiment of the invention, which is preferably used for remediation of ground water aquifers contaminated by VOCs by air sparging, the device preferably achieves a 4.9 cubic feet per minute (cfm) air flow at 25 pounds per square inch (psi) air pressure in continuous or intermittent operating modes. These are examples of operating parameters are consistent with enhanced bioremediation in the saturated zone and not volatilization of dissolved-phase VOCs or adsorbed VOCs in the saturated zone.

Figure 5:
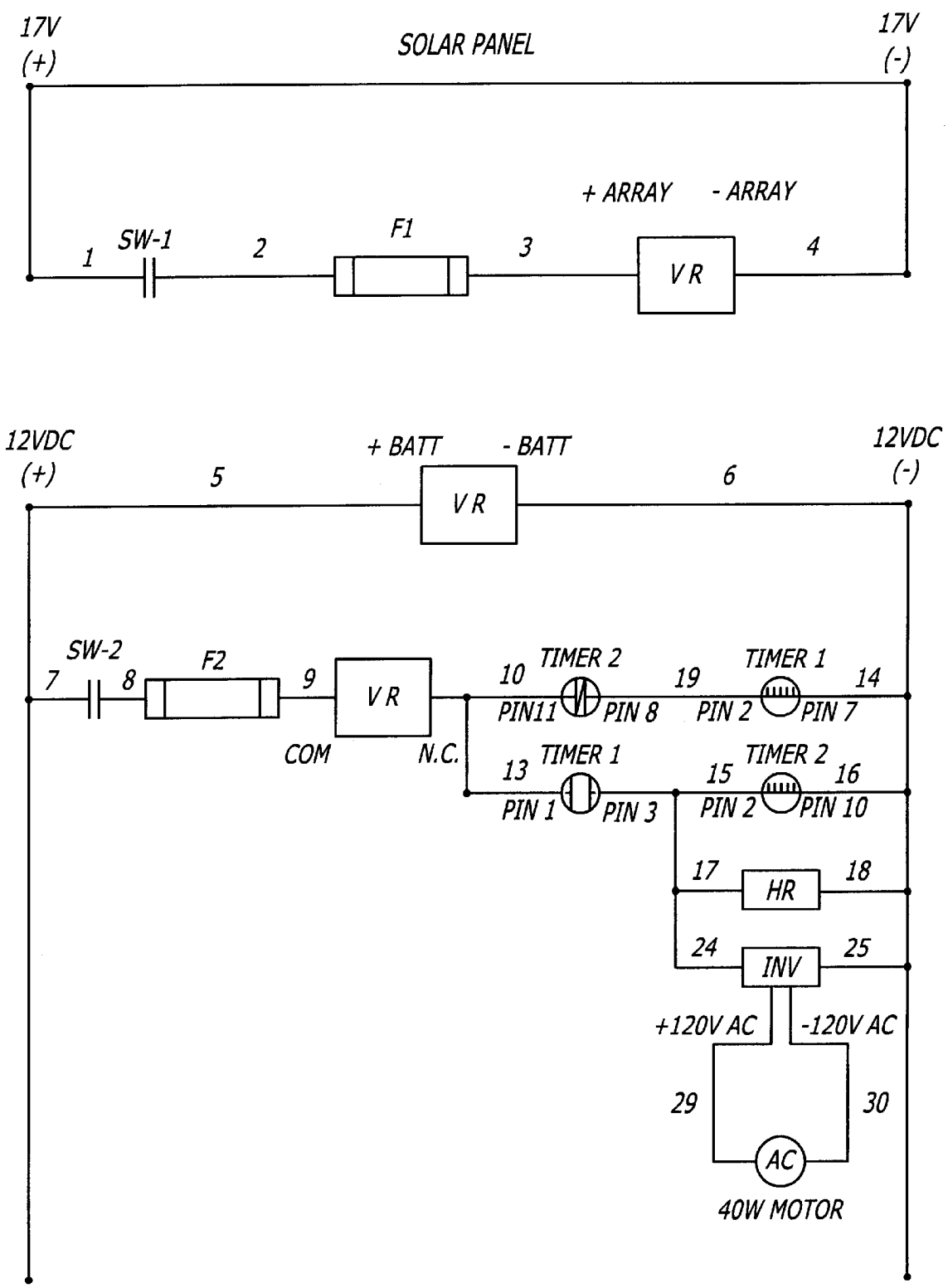
FIG. 5 depicts electrical ladder diagram of a fourth embodiment of the present invention.
Figure 6A:
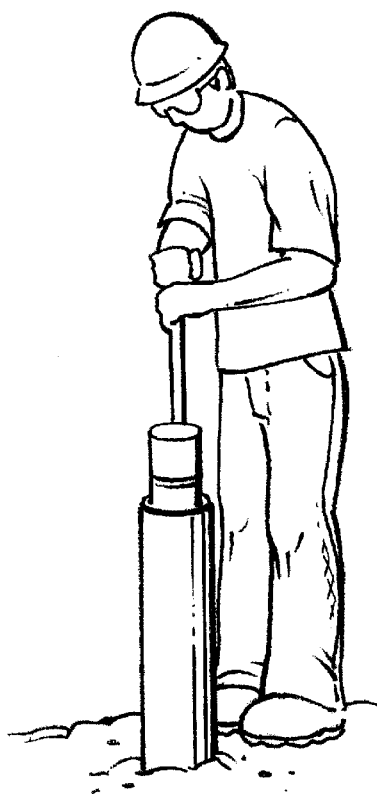
FIGS. 6A–F depict photographs of one embodiment of the present invention.
Figure 6B:
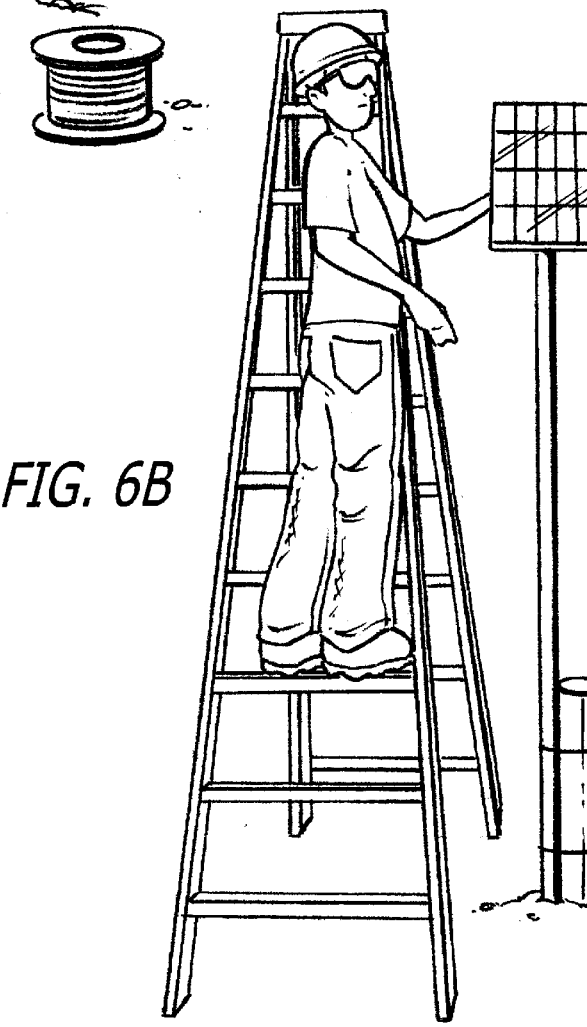
Figure 6C:
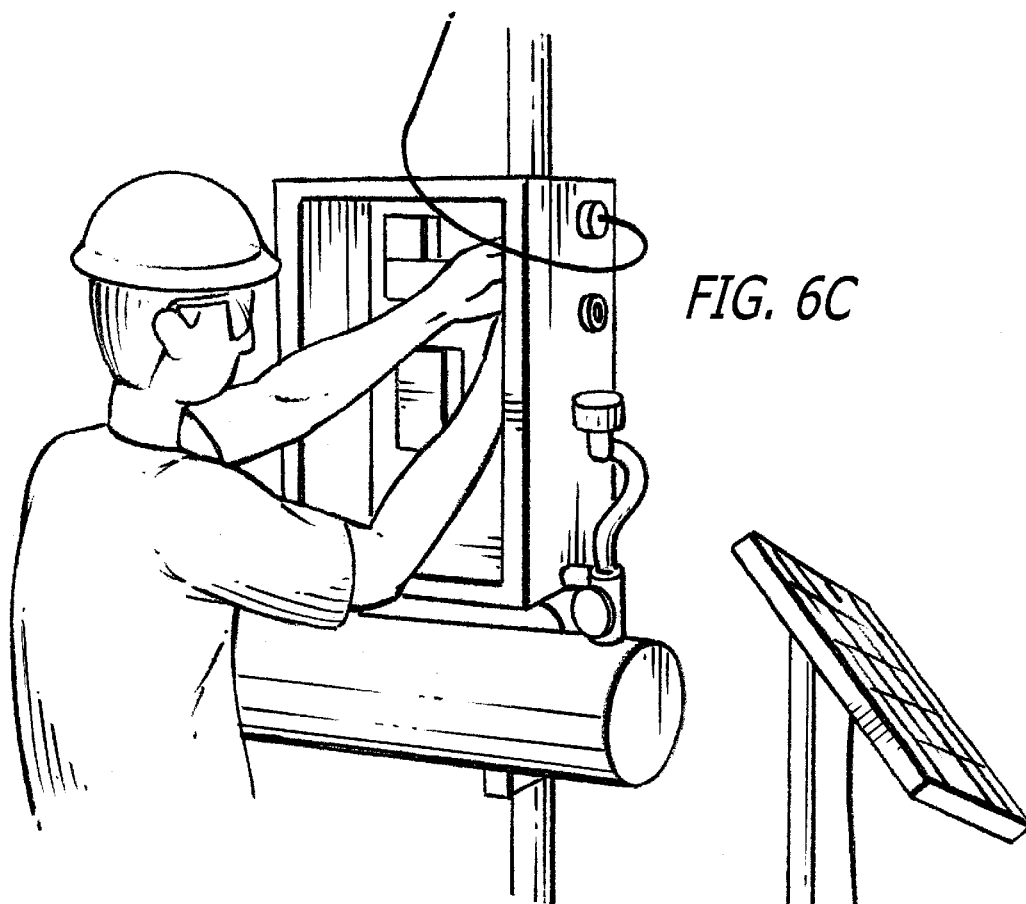
Figure 6D:
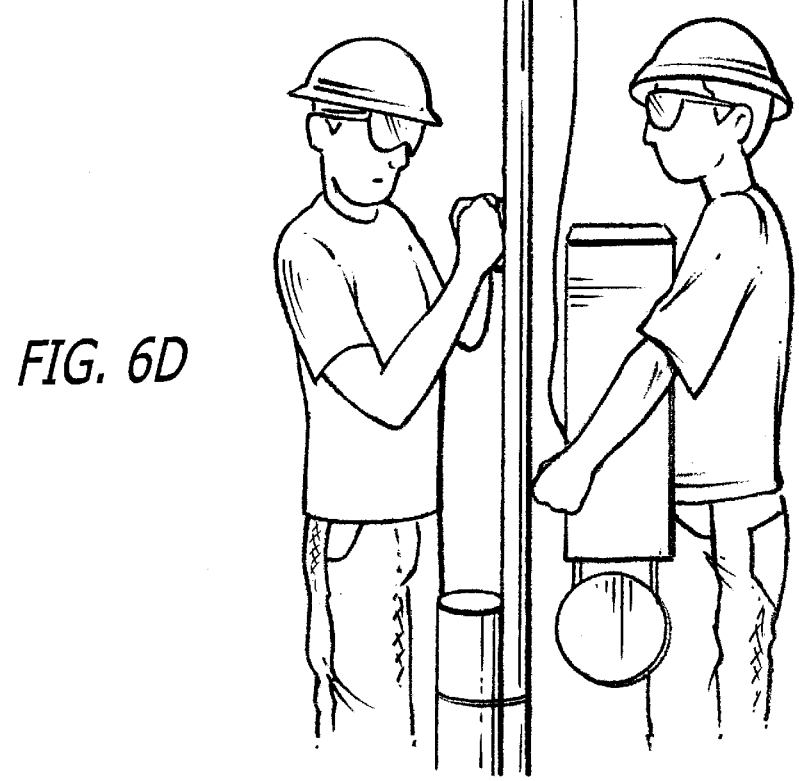
Figure 6F:
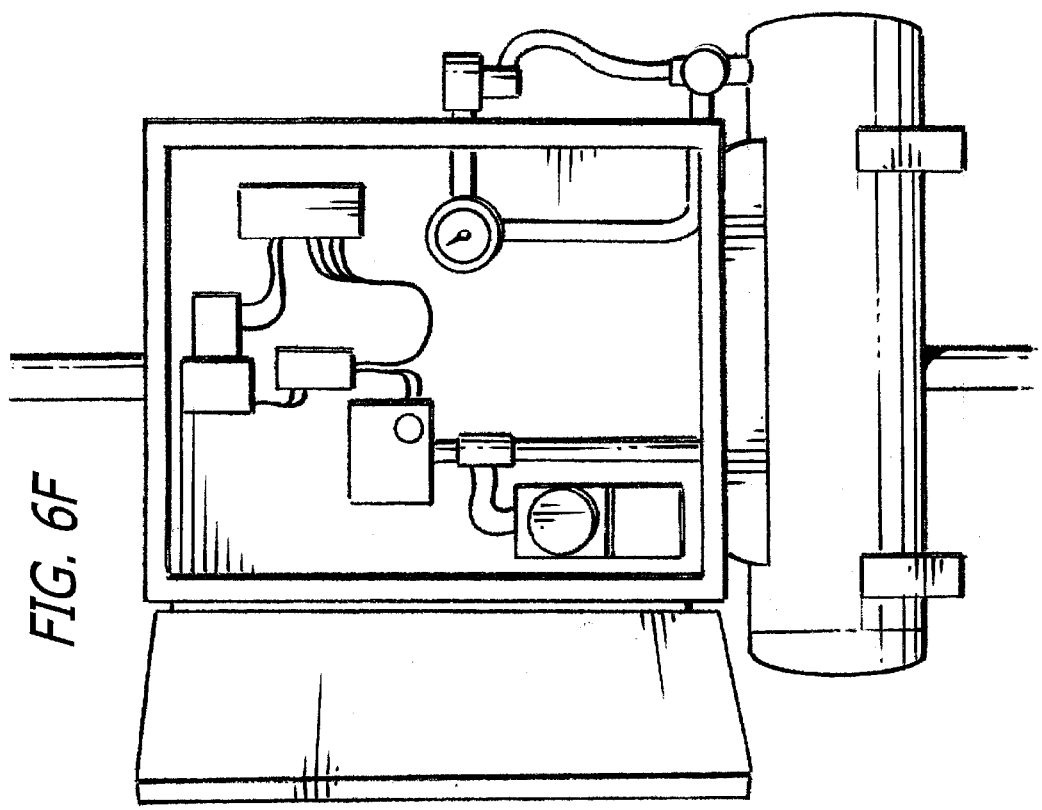
Figure 6E:
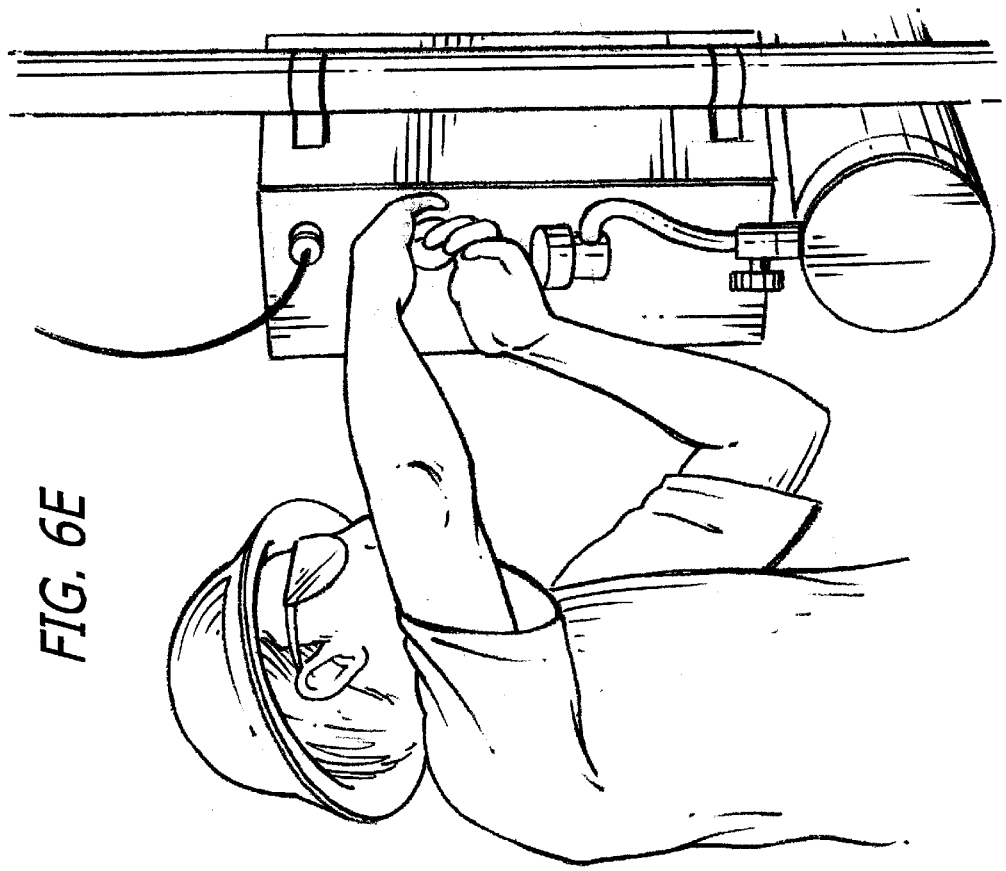

As above, the device preferably contains: a solar panel, a voltage regulator, a battery, a PLC, a control panel, an air compressor pump, an air receiver tank and a solenoid valve. The device also preferably includes a pneumatic pump installed into an air sparging well for pumping air into the well (FIG. 5).

As above, the device is preferably controlled by a PLC. The PLC can be programmed to regulate the flow rate of the pump. For example, at lower air flow rates bioremediation can be achieved without volatilization. At higher air flow rates volatilization and migration of the contaminants to the unsaturated zone can be achieved.

The device may further include a DO meter located within the aquifer such that the level of oxygen can be monitored and the frequency and duration of the sparging can be controlled by the PLC.

In a fourth embodiment of the invention, which is preferably used for remediation of soil above the ground water table contaminated by VOCs by bioventing, the device preferably achieves a 2.5 cubic feet per minute (cfm) air flow at 5.5 pounds per square inch (psi) air pressure, pumping for six hours a day over three days, without sunlight to recharge the battery.

As above, the device preferably contains: a solar panel, a voltage regulator, a battery, a PLC, a control panel, an air compressor pump, an air receiver tank and a solenoid valve. The device also preferably includes a pneumatic pump installed into an vapor well for pumping air into the well.

As above, the device is preferably controlled by a PLC which can be programmed to regulate the flow rate of the pump. For example, at lower air flow rates bioventing can be achieved without volatilization. At higher air flow rates volatilization and migration of the contaminants to the unsaturated zone can be achieved.

The device may also further include a DO meter located within the vapor well such that the level of oxygen can be monitored and the frequency and duration of the venting can be controlled by the PLC.

In a fifth embodiment of the invention, which is preferably used for remediation of soil contaminated by VOCs by air extraction, the device preferably achieves a 10 cubic feet per minute (cfm) air flow at 25 inches of water column vacuum, pumping for six hours a day over three days, without sunlight to recharge the battery.

As above, the device preferably contains: a solar panel, a voltage regulator, a battery, a PLC, a control panel, an air compressor pump, an air receiver tank and a solenoid valve. The device also preferably includes a vacuum pump. Alternatively, the device also preferably includes a blower which can preferably produce a flow equivalent to that of the vacuum pump.

As above, the device is preferably controlled by a PLC which can be programmed to regulate the flow rate of the vacuum or pump. For example, at lower air flow rates bioventing can be achieved without volatilization. At higher air flow rates volatilization and migration of the contaminants to the unsaturated zone can be achieved.

In a sixth embodiment of the invention, which is preferably used for remediation of groundwater or soil contaminated by VOCs by delivery of chemicals and nutrients to the aquifer, the device preferably achieves a power supply of 105 amp-hours for pumping for six hours a day over three days, without sunlight to recharge the battery.

As above, the device preferably contains: a solar panel, a voltage regulator, a battery, a PLC, a control panel, an air compressor pump, an air receiver tank and a solenoid valve. The device also preferably includes a peristaltic pump.

As above, the device is preferably controlled by a PLC which can be programmed to regulate the flow rate of the peristaltic pump.

The device may further include a pH meter located within the aquifer such that the dosing frequency and concentration can be controlled by the PLC.

Further, in concert with any of the embodiments described above, several injection wells may be spaced out over the zone of contamination. Thus the solar array size, battery capacity, and the number and. or power of pumps used can be increased to adjust for the increased area serviced by this device.

Although the present invention has been described in terms of the preferred embodiments above, numerous modifications and/or additions to the above-described preferred embodiments would be readily apparent to one skilled in the art.

EXAMPLE 1

Device: A 20-watt photovoltaic cell was used to convert sunlight into electricity which charged a 12-volt gel cell battery. The battery then powered the 1/10 HP air compressor and controls. A 20 psi (137 kPa) differential air compressor kept the air receiver tank (3 gallon (11.4 L) pressure between 55–75 psi (379–517 kPa). The switch operated the air compressor when the pressure levels dropped to 55 psi (379 kPa), and shut the compressor off when the pressure increased to 75 psi (kPa). The receiver tank was equipped with a regulator, a pressure gauge and a solenoid valve. The solenoid valve supplied air to the in-well non-auto pneumatic skimmer pump at timed intervals. The programmable relay timers allowed product recovery between 0–30 gallons (0–114 L) per day depending on the amount of product present and the amount of time needed for the product thickness to rise to near original levels after pumping down to a sheen.

Figure 7:
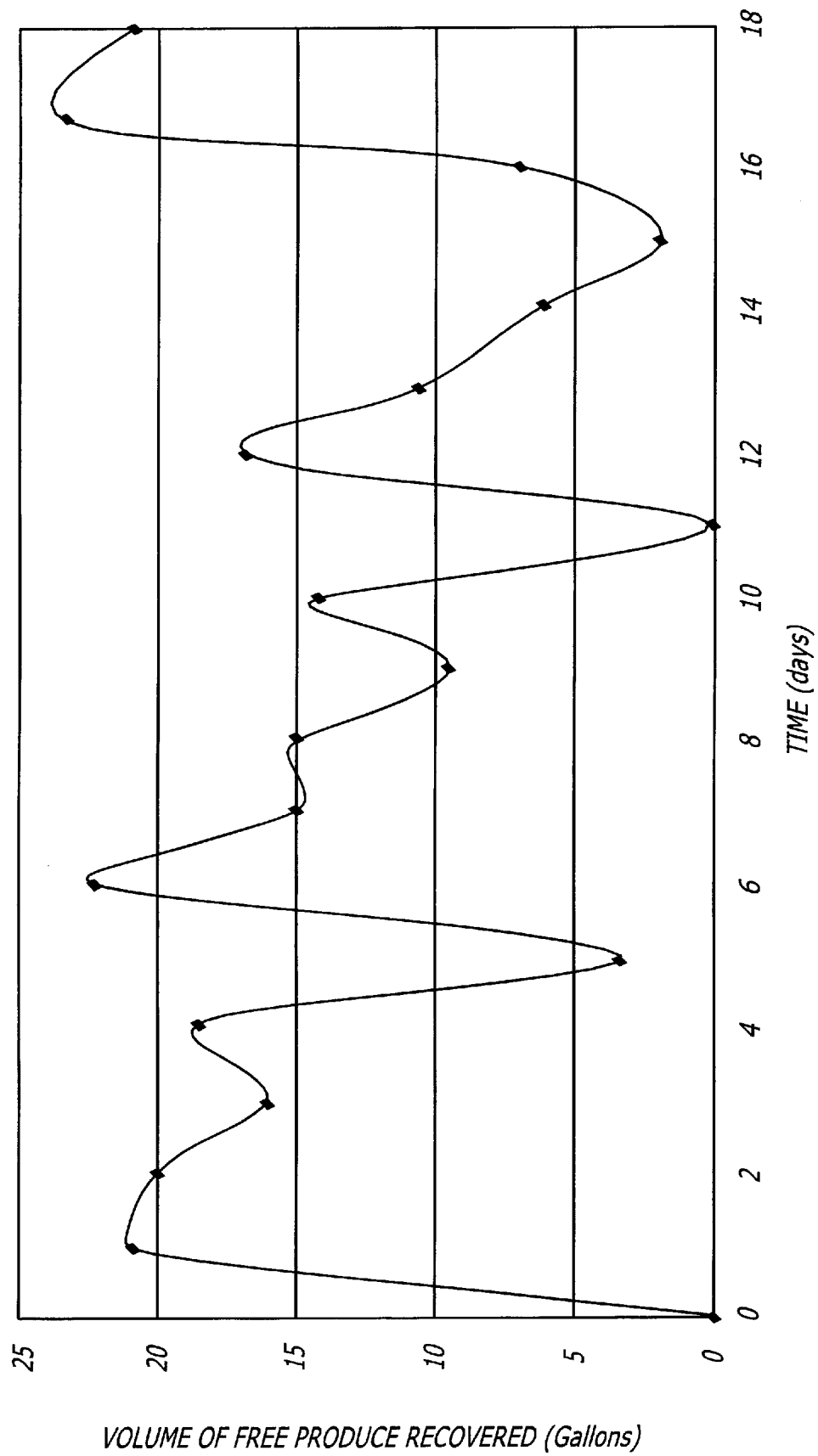
FIG. 7 depicts a graphic chart of the volume of free product recovered each day during the testing period.
Figure 8:
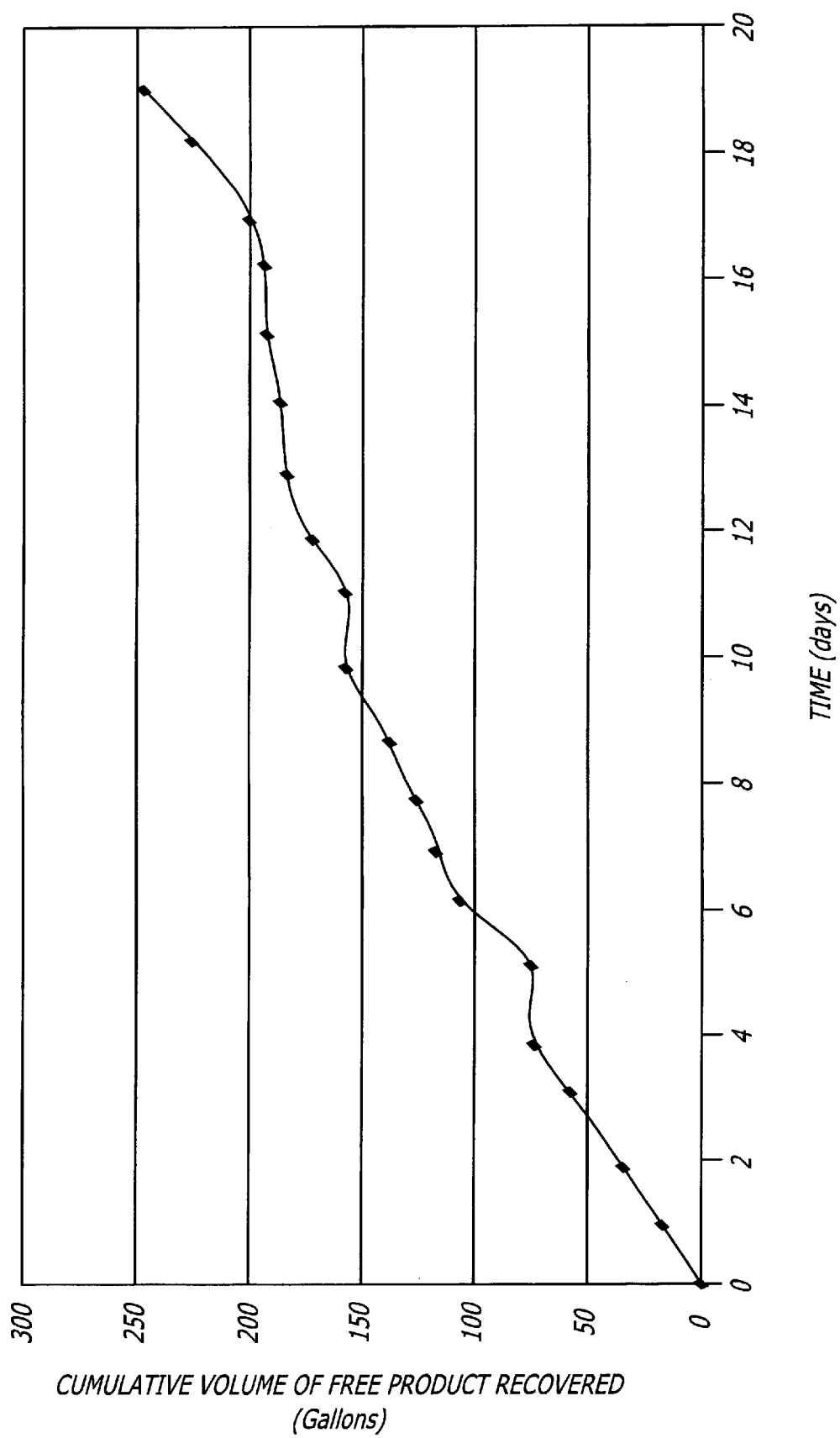
FIG. 8 depicts a graphic chart of the cumulative volume of free product recovered during the testing period.
Figure 9:
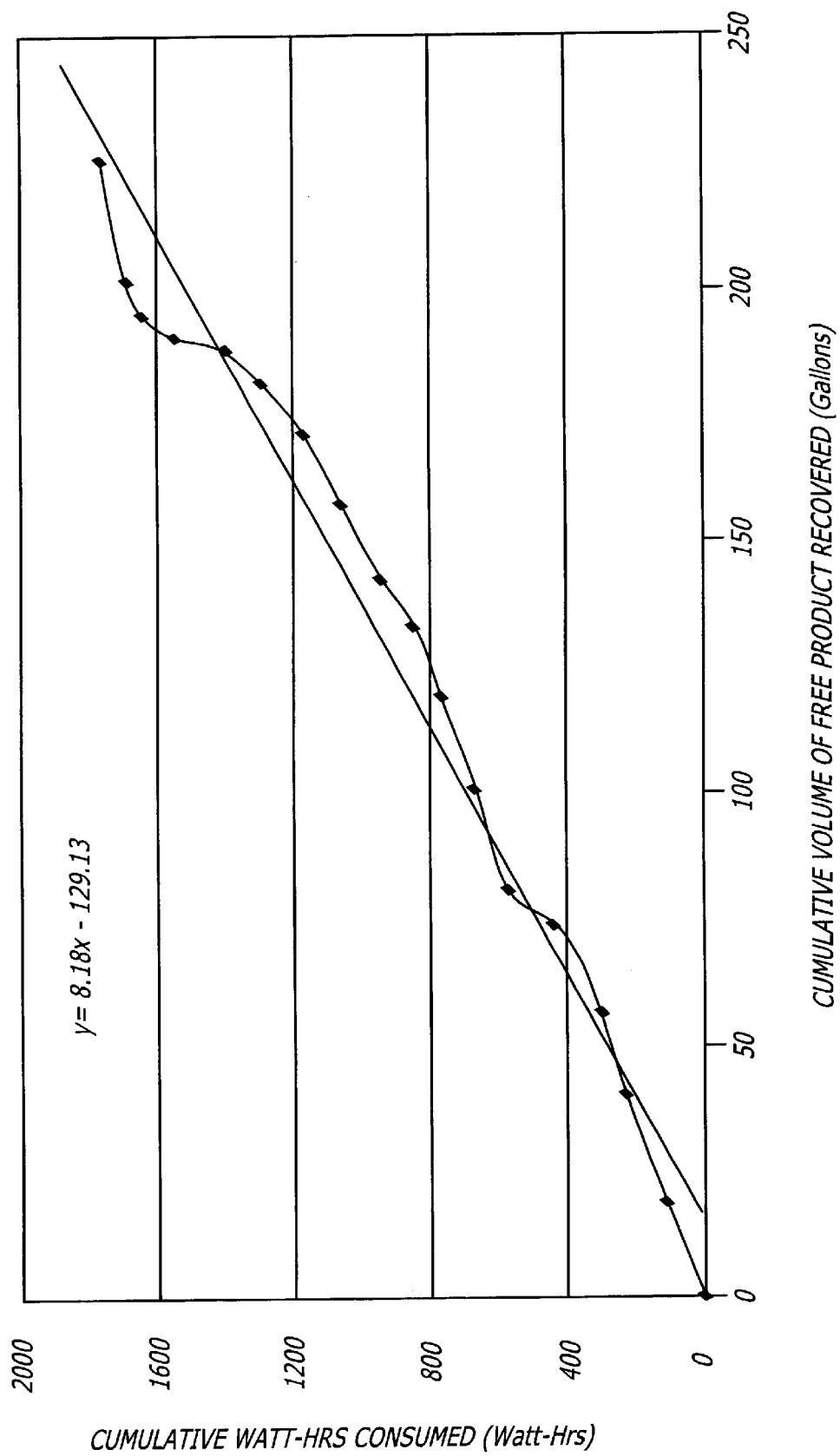
FIG. 9 depicts a graphic chart of the cumulative watt-hours consumed versus cumulative volume of free product removed.

The device was installed (FIGS. 6A–F) at a petroleum storage facility for 18 days FIGS. 3A–F. The well was 21 m deep, with approximately 3.7 m of NAPL product. The groundwater was 19.5 m deep. The volume of free product recovered each day during the testing period is in FIG. 7. The cumulative volume of free product recovered during the testing period is in FIG. 8. The total volume recovered during the test period was 245 gallons (927 L), with a daily average of 12.9 gallons (48.8 L). FIG. 9 represents the cumulative watt-hours consumed versus cumulative volume of free product removed. The value of 8.18 represents a high estimate for the watt-hours consumed by the device per gallon of free product recovered.

EXAMPLE 2

Device: A 20-watt photovoltaic cell was used to convert sunlight into electricity which charged a 12-volt gel cell battery. The battery then powered the 1/10 HP air compressor and controls. A 20 psi (137 kPa) differential air compressor kept the air receiver tank (3 gallon (11.4 L) pressure between 55–75 psi (379–517 kPa). The switch operated the air compressor when the pressure levels dropped to 55 psi (379 kPa), and shut the compressor off when the pressure increased to 75 psi (kPa). The receiver tank was equipped with a regulator, a pressure gauge and a solenoid valve. The solenoid valve supplied air to the pneumatic pump.

Figure 10:
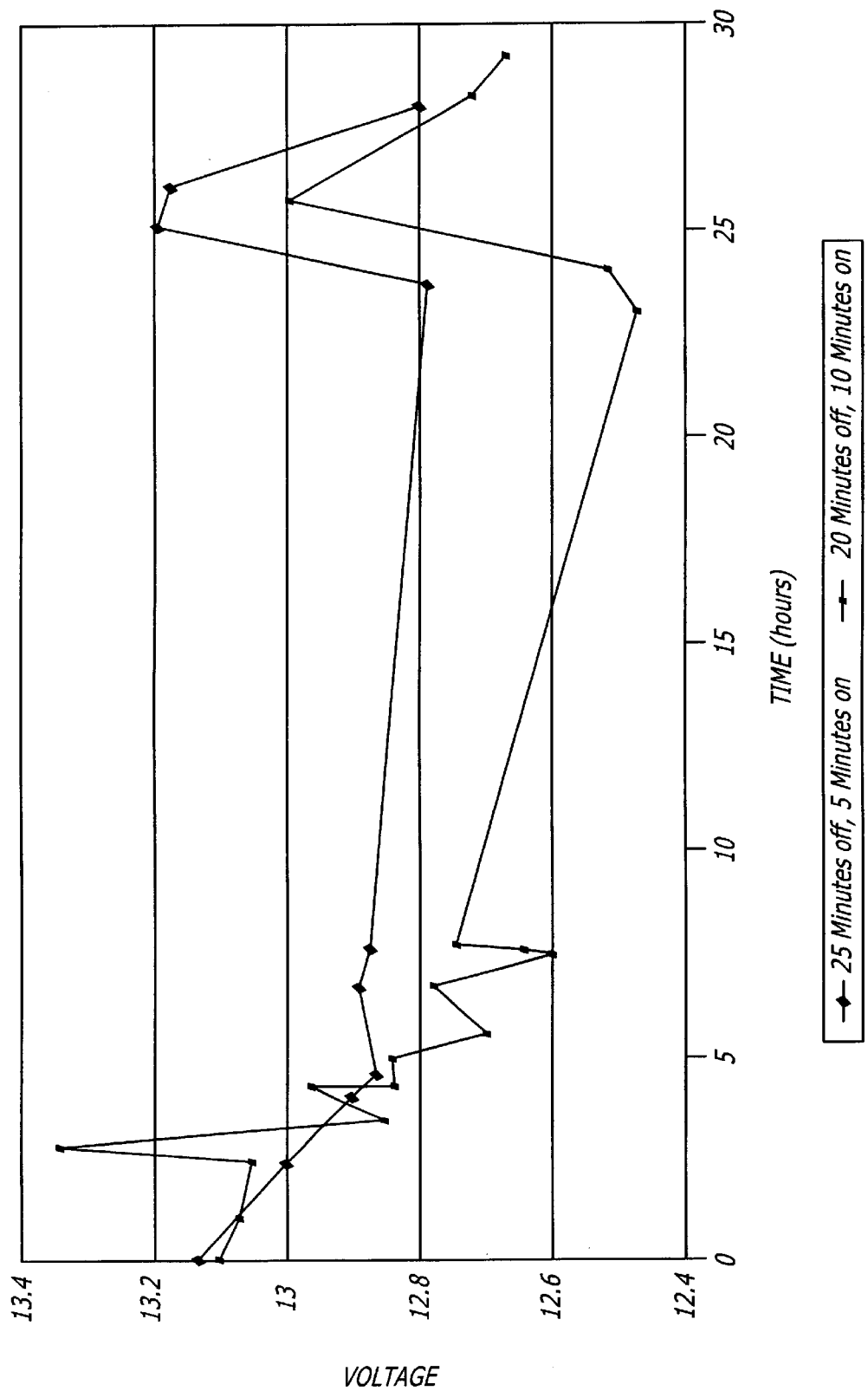
FIG. 10 depicts a graphic chart of the typical daily device voltage variations using two different timing sequences.

The device was tested 13 days in a location receiving approximately 3 hours of sunlight a day. The pump was blowing to atmosphere, with no tubing or resistance. FIG. 10 presents typical daily device voltage variations using two different timing sequences. For test 1, the timing sequence was 25 min. of idle time, and 5 min. of pump time, equivalent to 4 hours of pumping time per day. The second timing sequence tested was 20 minutes of idle time and 10 minutes of pumping time, equivalent to 8 hours of pumping time per day.

In closing, it is noted that specific illustrative embodiments of the invention have been disclosed hereinabove.

However, it is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. §112 unless the term "means" is used followed by a functional statement.

What is claimed is:

1. An environmental remediation device for use in methods of remediation of contaminated ground water and/or soil which employ pumps at a redemption site, said device comprising:

solar powered means for producing electricity;

a voltage regulator means for regulating electrical power flow to a battery;

a battery and means for electrically connecting said solar powered means to charge said battery through said voltage regulator means;

a programmable logic controller;

an air compressor pump means driven by said solar powered means and battery;

an air receiver tank means for receiving and storing compressed air supplied from said air compressor pump means; and pump means for use in effectuating the remediation of said groundwater and/or soil operated by compressed air supplied from said air receiver tank means under the control of said programmable logic controller.

2. An environmental remediation device for use in methods of remediation of contaminated ground water and/or soil which employ pumps at a redemption site, said device comprising:

means for regulating electrical power flow to a battery producing electricity;

a voltage regulator means for regulating electrical power flow to a battery;

a battery and means for electrically connecting said energy source means to charge said battery through said voltage regulator means;

a programmable logic controller;

an electric motor operated by said solar powered means and said battery; and pump means for effectuating the remediation of said groundwater and/or soil operated by said electric motor under the control of said programmable logic controller.

3. The environmental remediation device of claim 1 further comprising a sensor means for detecting contaminates in said groundwater and/or soil.

4. The bioremediation device of claim 2 further comprising a sensor means for detecting contaminates in said groundwater and/or soil.

5. A device for use in methods of remediation of contaminated ground water and/or soil which employ pumps at a redemption site, said device comprising:

solar powered means for producing a minimum of 16 to 20 amp-hours per day at 75 percent sunlight for a minimum of four hours;

battery means, electrically connected to said solar powered means, for providing 12-volt DC power when said power source means is not providing power;

pump means for use in effectuating the remediation of said groundwater;

means operated by electrical power from said solar powered means and battery for operating said pump means; and a programmable logic controller means powered by said solar powered means and battery for controlling the operation of said pump means.

6. The bioremediation device of claim 5 wherein said means for effectuating the remediation of said groundwater comprises one of the following;

a pneumatic pump, a vacuum pump, a blower, or a peristalic pump.

7. The environmental remediation device of claim 5 wherein said means operated by electrical power comprises an air compressor and air receiver tank providing compressed air to said pump means.

8. The environmental remediation device of claim 5 further comprising sensor means for detecting contamination in said groundwater and/or soil.

* * * * *